United States Patent [19]

Roderick

[11] 3,999,475
[45] Dec. 28, 1976

[54] DISPLAY APPARATUS FOR HOLDING FOOD AND THE LIKE

[75] Inventor: Ronald R. Roderick, Evergreen, Colo.

[73] Assignee: National Equipment Corporation, Denver, Colo.

[22] Filed: Dec. 26, 1974

[21] Appl. No.: 536,456

[52] U.S. Cl. .............................. 99/474; 312/236; 126/21 A
[51] Int. Cl.² ................. A23B 4/04; B60H 3/00; A47B 77/08; A47F 3/04
[58] Field of Search ............... 99/474, 477, 479; 312/31, 236, 250, 136; 34/196; 126/20, 20.1, 20.2, 21 A

[56] References Cited

UNITED STATES PATENTS

| 2,262,104 | 11/1941 | Lambrecht et al. | 312/236 |
| 2,364,722 | 12/1944 | Kazantzeff | 34/196 X |
| 3,545,832 | 12/1970 | Levenback | 312/236 X |
| 3,614,923 | 10/1971 | Thompson | 126/21 A X |
| 3,895,215 | 7/1975 | Gordon | 126/21 A X |

Primary Examiner—Harvey C. Hornsby
Assistant Examiner—Robert Pous
Attorney, Agent, or Firm—Ancel W. Lewis, Jr.

[57] ABSTRACT

An apparatus and method for holding food and the like at desired temperature and moisture levels for an extended period of time wherein a holding chamber confines a volume of air about a food disposed therein, an air flow supply produces a stream of heated humidifed air that is directed in a curtain-like vortex pattern around the outer perimeter of the inside of the holding chamber to form a core of relatively still, heated moisturized air about the food to transmit heat and moisture thereto without a significant amount of air flow in direct contact with the food. A power control circuit is used to selectively operate a blower motor that circulates the air in a closed air flow system, a heating element that heats the air, a removable food rack motor that rotates the food in the holding chamber and lights that illuminate the food in the holding chamber.

15 Claims, 9 Drawing Figures

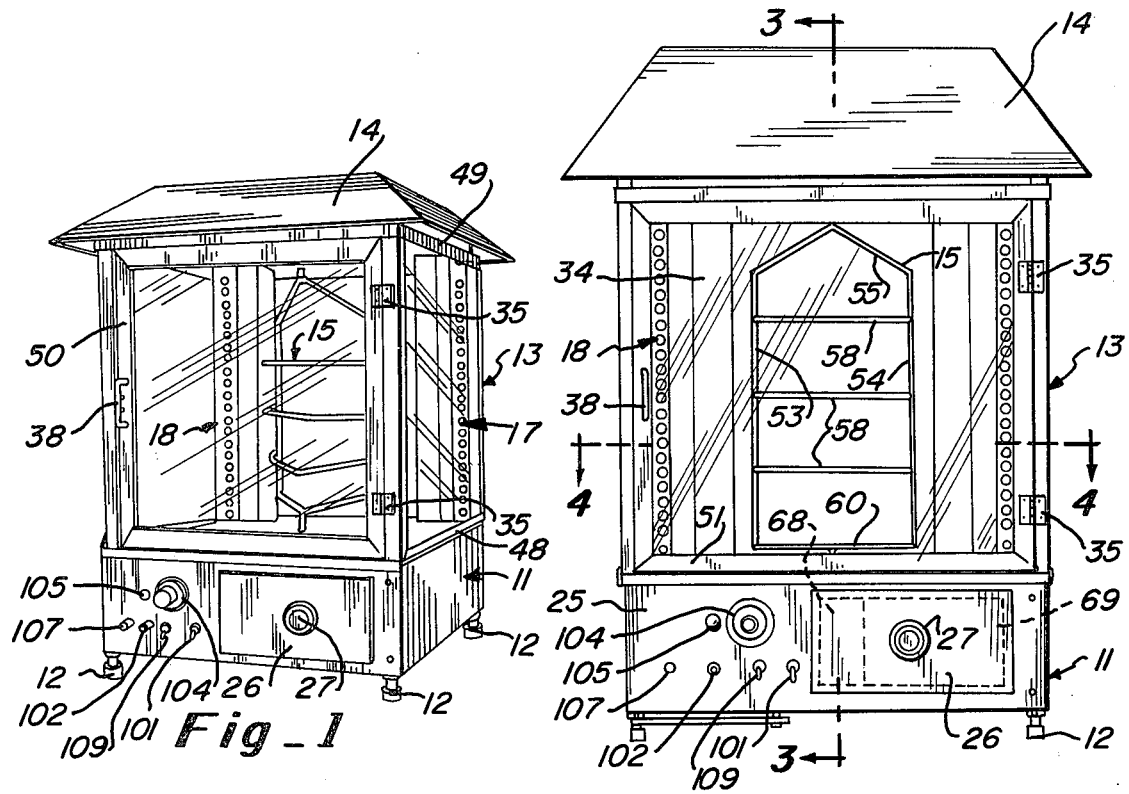
Fig_1
Fig_2
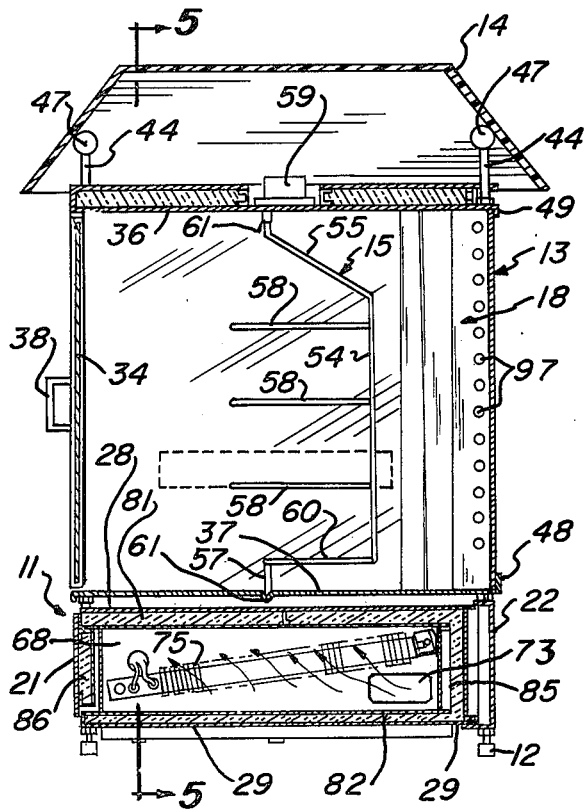
Fig_3
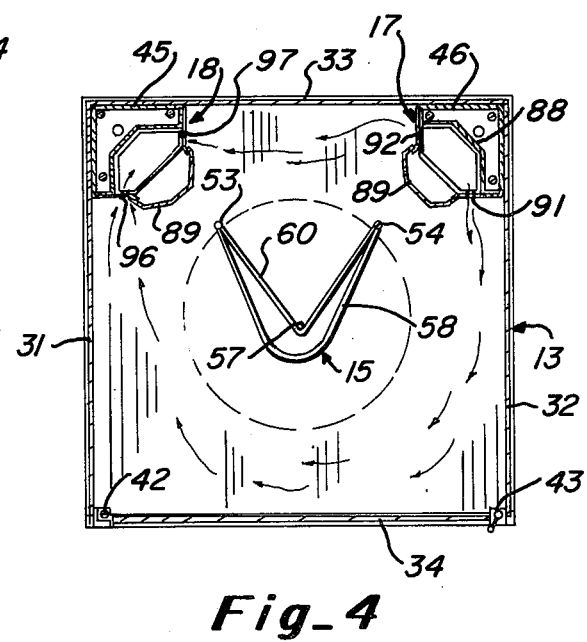
Fig_4

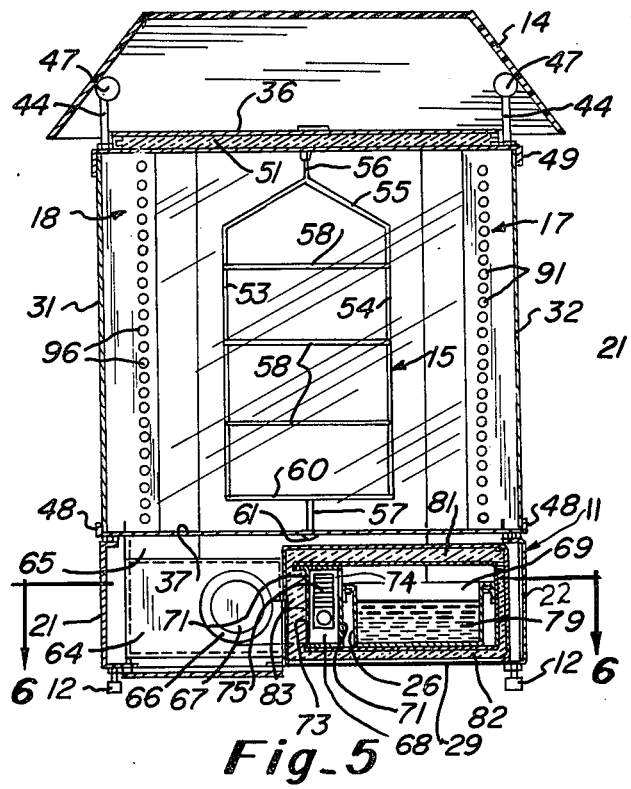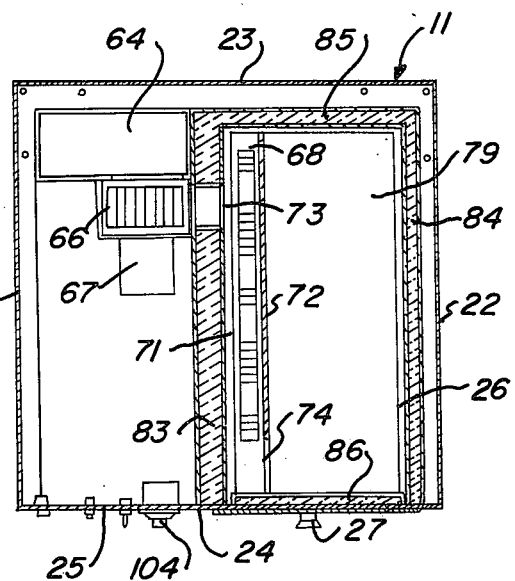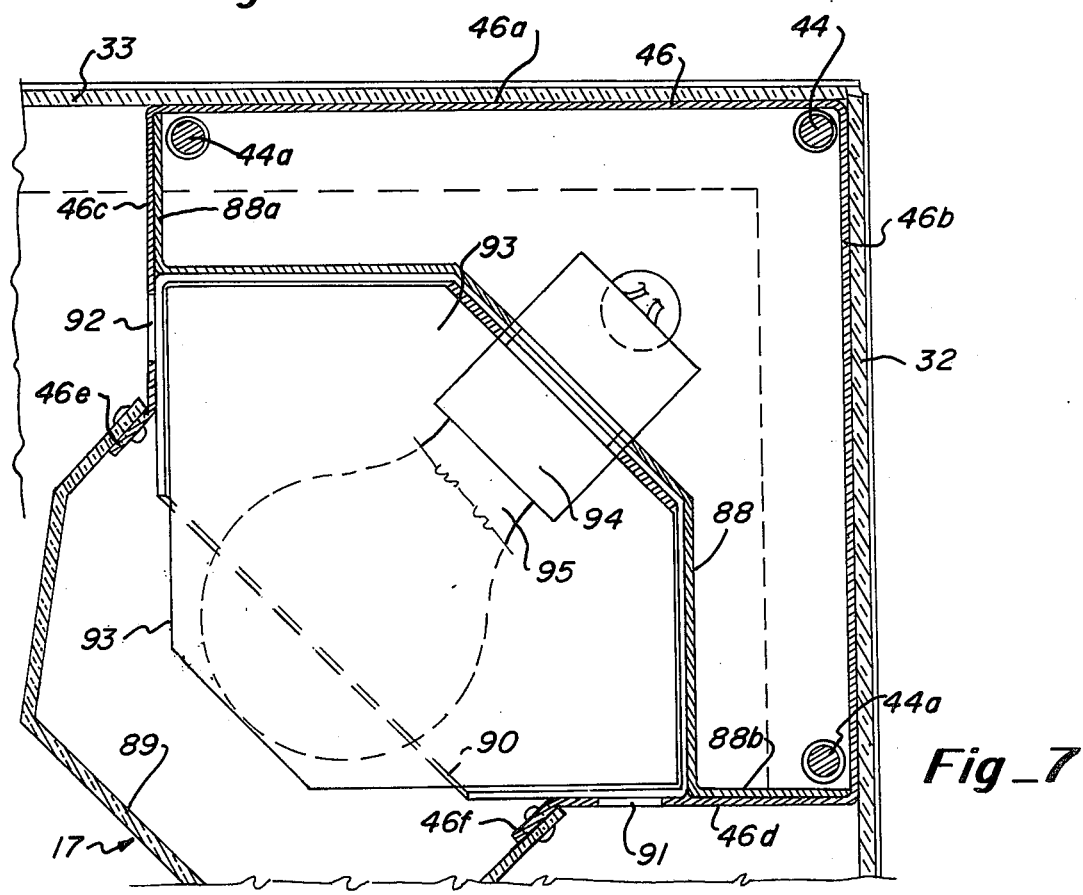

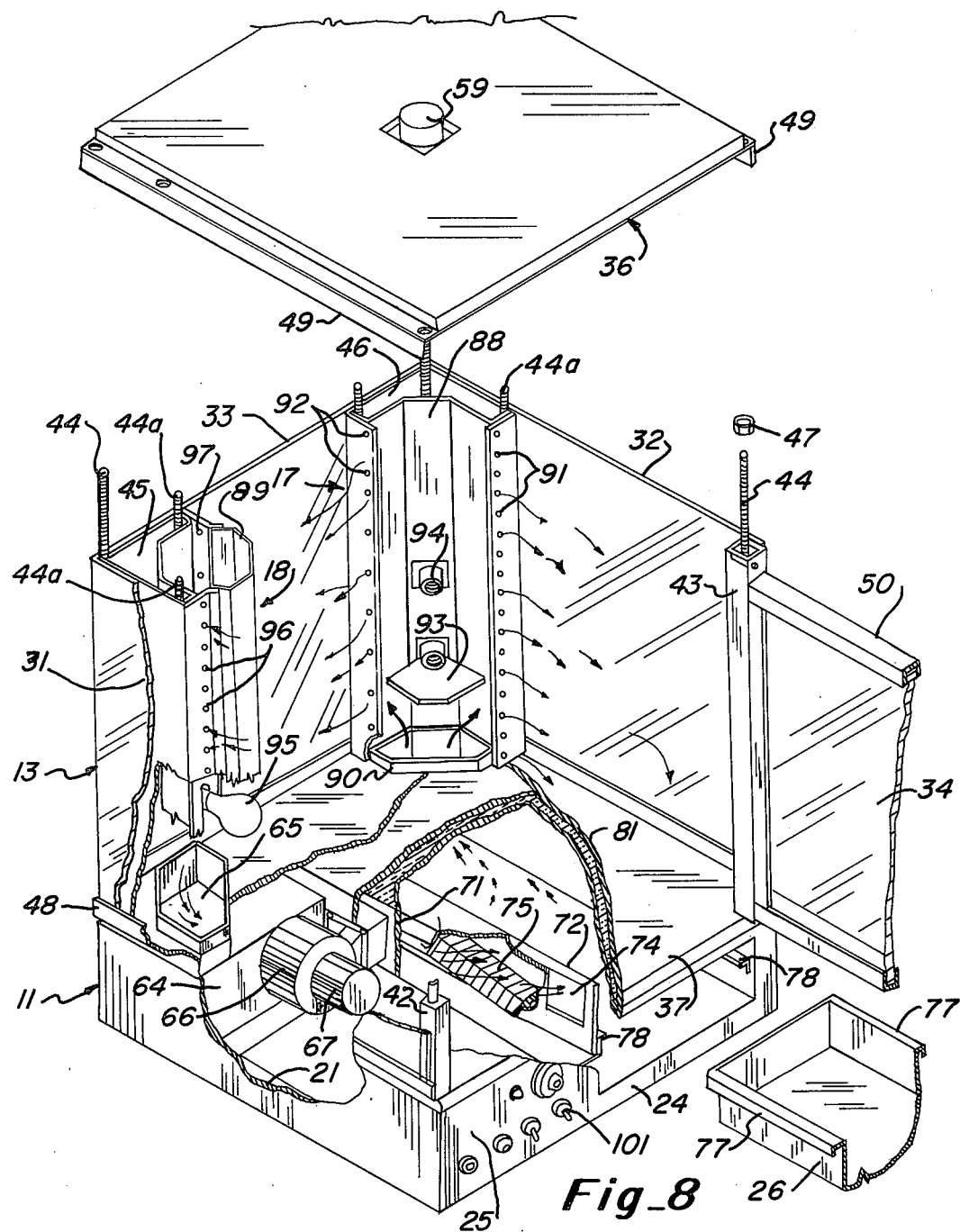
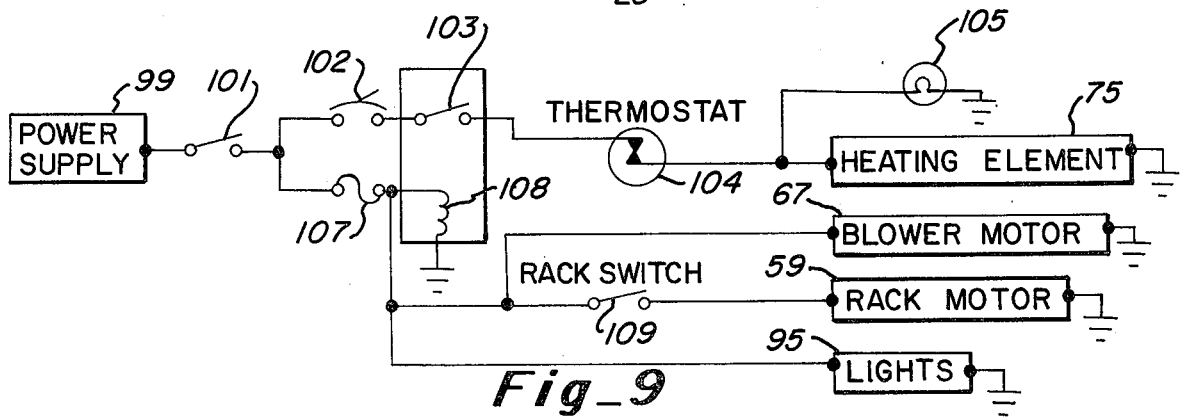

DISPLAY APPARATUS FOR HOLDING FOOD AND THE LIKE

BACKGROUND OF THE INVENTION

1. Field

This invention relates to holding food and the like at substantially uniform temperatures for extended periods of time while maintaning a desirable moisture content therein.

2. Description of the Prior Art

In an earlier filed application Ser. No. 370,328, filed on June 15, 1973, entitled Heat-Holding Method and Apparatus, there is disclosed a holding chamber for food and the like in which heated gases are separated by imperforate walls to avoid direct contact with and a deleterious drying effect on the food. The present invention is directed to accomplishing similar results but due to a necessity to display the food for sales purposes does not have a physical imperforate wall or barrier between the heated, moisturized gases and the food thereby allowing the food to be displayed for sales purposes. This is particularly important in the retail sales of reconstituted or hot foods including chicken, ribs, hamburgers, hot dogs, soft pretzels, hot sandwiches and pies and the like.

Accordingly, it is a general object of the present invention to provide a novel method and apparatus of holding or maintaining food and the like at desirable temperature and moisture levels for extended periods of time in a circumstance where the food is readily visible and attractively displayed to a purchaser thereof without the formation of significant moisture on the display case.

Another object of this invention is to provide a novel method and apparatus for holding food and the like in a thermostatically controlled atmosphere in which there is no significant direct contact or impingement of a flow of heated air with the food.

Yet a further object of the present invention is to provide a novel display apparatus and method for holding food and the like principally characterized by the formation of a curtain-like vortex pattern of air flow to form a heated, stable core of air about the food without having a significant air flow in direct contact with the food to transfer heat and moisture to the food.

Other objects, advantages and capabilities of the present invention will become more apparent as the description proceeds taken in conjunction with the accompanying drawings, in which:

FIG. 1 is a perspective view of display apparatus embodying features of the present invention;

FIG. 2 is a front elevation view thereof;

FIG. 3 is a sectional view taken along lines 3—3 of FIG. 2;

FIG. 4 is a sectional view taken along lines 4—4 of FIG. 2;

FIG. 5 is a sectional view taken along lines 5—5 of FIG. 3;

FIG. 6 is a sectional view taken along lines 6—6 of FIG. 5;

FIG. 7 is a top plan view of the inlet manifold to the holding chamber;

FIG. 8 is a fragmentary partially exploded perspective view of the display oven with parts broken away to show interior construction; and FIG. 9 is a schematic electric circuit diagram for the electrically operated devices employed in the display apparatus.

Referring now to the drawings, in general the display apparatus shown comprises a support housing 11 with adjustable feet 12 at each corner for leveling purposes, a display housing or case 13 mounted on the support housing defining a food holding chamber for various types of food described hereinafter and a canopy-type top cover 14 removably mounted on top of the display case 13. A food supporting rack 15 is mounted in the display case and adapted to be rotated therein. Within the lower support housing 11 there is provided apparatus described in detail hereinafter for producing a stream of heated, humidified air under pressure and within the display case 13 there is provided manifold structure that directs the stream of heated, humidified air in the holding chamber in a curtain-like vortex pattern around the outer perimeter of the inside thereof in such a way as to form a core of relatively still heated, moisturized air about the food disposed therein to maintain the food at desired temperature and moisture levels. This manifold structure in general is comprised of an inlet manifold and an outlet manifold assembly designated generally by numerals 17 and 18, respectively.

The support housing 11 shown is fabricated from sheet metal and is in the form of a generally hollow oblong body comprised of opposed side wall portions 21 and 22, a rear wall portion 23, and a front wall portion 24. A part of the front wall portion 24 forms a control panel 25 and an adjacent part has an opening adapted to slidably receive a water pan 26 with a pull knob 27 on the front thereof. The support housing further has a top panel 28 and a bottom panel 29 in spaced parallel relation to one another.

The display case 13 is also in the form of a hollow oblong body with a transverse cross sectional dimension similar to that of the support housing on which it is supported and is comprised of a pair of opposed, transparent side wall panels 31 and 32, a transparent back wall panel 33 and a front door panel 34 hinged by a pair of flag hinges 35 to swing between open and closed positions to provide access thereinto together with a top wall panel 36 and a bottom wall panel 37. A handle 38 is provided on the front door panel 34. In the construction shown, there are two front corner posts 42 and 43 of a similar construction fabricated from a length of square tubing through which connecting fasteners in the form of externally threaded corner bolts 44 extend and two rear corner post panels 45 and 46 of a similar construction at the rear corners also having corner bolts 44 extending up therethrough. A resilient bushing 47 is mounted on the upper ends to the corner bolts 44 on which the top cover 14 rests. In general, the corner bolts 44 are used to releasably fasten the display case on the support housing with the display case being readily assembled on the support housing.

As best seen in FIG. 7 the rear corner post 46 has four sides 46a, 46b, 46c and 46d arranged in a box shape with flared flanges 46e and 46f along an open corner that faces the holding chamber. An additional pair of auxiliary fastening bolts 44a are arranged inset from the corners of each of the rear corner posts. The side wall panels 31 and 32 are constructed as transparent sheet material preferably glass, which releasably insert into upturned lips 48 on the bottom wall panel 37 and downturned lips 49 on the top cover 36. With this construction the side and rear panels 31, 32 and 33 can be readily removed from the case and readily replaced therein without a complete disassembly of the case. The front door panel 34 is made of a sheet of transparent material with a metal channel-shaped reinforcing rim 50 along each of the edges. The removable top wall panel 36 is shown as having a layer of heat insulation 51.

The food holding rack 15 is shown for holding circular pizza pans and the like is comprised of a pair of spaced parallel upright side rod sections 53 and 54 with an upper rod section 55 that converges in a common upper rod 56 and at the lower rod section 60 then terminates in a common lower rod section 57. The connections of the rod sections are by welding. A plurality of generally V-shaped pan supporting shelves 58 are connected at their diverged ends to the side rod sections 53 and 54 and the shelves are disposed at vertically spaced intervals. The lower rod section 57 fits in a recess in bottom wall panel 37 and the upper end of the ract section rod 56 is releasably coupled to a rack motor 59 by a coupling 61 that allows the rack to be readily removed from the display case. The rack motor rotates the rack at a continuous relatively slow rate of speed to display the food therein.

The structure for generating or producing heated humidified air and circulating it in a closed loop system is contained within the support housing 11 and as shown comprises an air receiving box 64 in a rear corner thereof arranged with a top opening 65 in flow receiving relation to the return air from the outlet manifold 18. A blower 66 having a motor 67 is mounted on the air receiving box 64 and receives air from the air receiving box and forces it into a heating chamber 68 extending from rear to front within the housing together with a moisture chamber 69 formed in a space above the water in the water pan 26.

The heating chamber 68 is formed by a pair of spaced panels 71 and 72 that divide the lower support housing and are closed at the ends. An air inlet 73 into the heating chamber is provided in a lower portion of panels 71 at the rear of the housing and the outlet of the blower is mounted on panel 71 over the inlet 73 from the heating chamber is provided in an upper portion of the panel 72 that leads into the moisture chamber 69. A heating element 75 is shown to be of the electric fin-type mounted in the heating chamber on an upward angle of incline from rear to front as best seen in FIG. 3. In this way the air is blown in an upward and forward course of travel over the fins on the heating element.

The moisture chamber 69 is the inner wall surfaces of the support housing and the body of water in the water pan. The water pan 29 has a pair of outward by projecting downturned flanges 77 on opposite side edges at the top which slide over a pair of supporting rails 78 mounted inside the housing. The outlet of the moisture chamber is in the rear corner leading into the inlet manifold. In use the pan is filled with water represented at 79.

All of the sides of the heating and moisture chambers are shown to be heat insulated. Specifically, there is a layer of insulation material 81 across the top, a layer of heat insulation material 82 across the bottom and a layer of heat insulation material 83 outside wall 71 and a layer of heat insulation material 84 outside the outer side of the water pan. There is further provided a layer of heat insulation material 85 across the back and a layer of heat insulation material 86 across the front of the pan. In this way all of the surfaces of the heating and moisture chambers are insulated against loss of heat and to prevent "hot" spots.

The inlet and outlet manifold assemblies 17 and 18, respectively, are of generally similar construction. The inlet manifold is comprised of an upright duct assembly formed by a fabricated multi-sided, through-like member 88 along the back side that has a pair of end portions 88a and 88b in FIG. 7 that slide behind portions 46c and 46d, respectively, to be held in place together with a multi-sided translucent removable lens or cover member 89 along the front side that has opposed side edges 89 that fit outside and in a releasable frictional engagement with the end portions 46e and 46f of member 46. The portion of corner member 46d forming the duct adjacent side wall 32 are provided with a plurality of outlet openings 91 arranged as in a column at equally spaced intervals to direct the flow of air in a parallel relation to the bottom and along the inside wall surface and a portion of the corner member 46c has a second column of outlet openings 92 that directs a curtain-like pattern of air along the back wall of the case as indicated by arrows. A baffle 93 is provided in the lower end of the inlet manifold. This baffle is shaped to leave a gap adjacent the cover 89 to inhibit the air flow to control flow up into the inlet manifold to provide a substantially uniform flow and out through each of the outlet openings 91 and each of the outlet openings 92 in the holding chamber. In essence the baffle arrangement converts the air flow from a dynamic pressure to a static pressure in the duct above the baffle 93. There are fewer outlet openings 92 than outlet openings 91 because less flow is required along the back wall. Within the assembly there are mounted two electric sockets 94 for electric lights 95 mounted to provide illumination of the food inside the display case.

In a similar manner the outlet manifold assembly 18 is comprised of a duct assembly having a column of equally spaced inlet openings 96 adjacent the side wall 31. Openings 96 are of the same size and number as openings 91. A column of equally spaced inlet openings 97 are formed in the outlet manifold duct opposite openings 92. These openings are of the same shape, size and number as openings 92. A negative pressure is provided at opening 96 and 97 so that air flows from openings 91 to openings 96 and from openings 92 to openings 97 in a curtain-like vortex pattern along the inside of the display case as indicated by arrows.

As is characteristic of a vortex flow pattern, the air at the center is essentially still and in this case the desired result is no significant air flow impingement on the food in the vortex pattern. It has been found that the velocity around the food would not exceed 3 feet per second. Another advantage of having the air flow along the outer perimeter of the food and adjacent the inside of the display case walls is that it prevents fogging or the condensation of moisture on the inside surface of the case which would otherwise impair the display of the food for sales purposes.

The actuation of the heating element 75, blower motor 67, rack motor 59 and lights 95 is regulated by a power control circuit having portions mounted on the control panel 75 and within the support housing. Referring now to FIG. 9, the schematic electric circuit diagram for controlling the electric power from a suitable AC power supply represented at 99 is illustrated as comprising a main power switch 101 mounted on the control panel for regulating all power to the electric devices in the circuit. The circuit divides into a high current circuit including a high current circuit breaker 102, a normally open relay contact 103, a thermostat 104 and heating element 75 connected in series with one another. The pilot light 105 mounted on the control panel is connected across the heating element 75. A low current circuit has a low current overload protectory 107 and four parallel circuits, each of these four circuits being separate electric devices which are the relay coil 108 magnetically coupled to the relay contact 103 for controlling same; the rack motor 59; the blower motor 67; and the lights 95. A rack switch 109 mounted on the control panel controls the power independently to the rack motor 59. In the operation, when the main power switch 101 is closed the relay coil 108 is energized and contact 103 is closed and the heating element 75 receives electric power and the blower motor runs. At any time when the circuit to the blower motor 67 is de-energized as when the protector 107 opens 108 then the relay coil drops out removing the power to the electric heating element.

In a full sequence of operation then, when the power switch 101 is closed the relay contact 103 is closed and the heating element 75 will heat. The blower 67 forces a stream of air through the heating chamber 68 over the heating element 66 where it is heated and over the surface of the body of water 79 in the moisture chamber where water is evaporated off the surface to form humidified air that is then moved past the baffle 93 and up into the inlet manifold assembly 17 and out openings 91 and 92 where it circulates through the holding chamber in the vortex pattern, through outlet openings 96 and 97, down through the air return box 64 and back into the blower 66 in a closed circulation system. The temperature of the air is adjusted by adjusting the thermostat 104. The movement of the blower via the air receiving box provides a negative pressure at the manifold inlet openings 96 and 97 in relation to the manifold outlet openings so that the air moves through the holding chamber in the curtain-like vortex pattern.

By way of example and not by way of limitation, a food holding apparatus and method in accordance with the practice of the present invention has the following characteristics:

| | |
|---|---|
| Power | 120 volts AC 15 amps AC |
| Heating Element | 1300 watts |
| Temperature Range | 70° F to 220° F |
| Dimensions of Display Case and Support Housing | 22¾" by 22¾" by 33" |
| Water Pan | 1 gallon |

In the operation of the above example the range of the temperature in the holding chamber was 165° F to 220° F and the moisture range was 18% to 30% relative humidity for this temperature range. The approximate desirable operating range for most foods was found to be at 165° F with a relative humidity of 20% to 25%.

Although the present invention has been described with a certain degree of particularity, it is understood that the present disclosure has been made by way of example and that changes in details of structure may be made without departing from the spirit thereof.

What is claimed is:
1. In apparatus for holding heat and moisture in food and the like, the combination comprising:

housing means having an inner wall surface defining a holding chamber for confining a volume of air about a food and the like;
 means for producing and directing a stream of heated air in the holding chamber in a prescribed pattern in said chamber that is in a direction substantially parallel to and along the inner wall surface of said housing means so as to be directed away from and yet in heat exchange relation to the food without a significant amount of air movement over and in direct contact with the surface of the food, said pattern being in the nature of at least a part of a vortex forming a core of substantially still, heated air about the food; and
 means for humidifying said stream of heated air introduced into said holding chamber.

2. In apparatus as set forth in claim 1 wherein said housing means is in the form of a display case having transparent walls and a transparent door movable between open and closed positions to provide access into the display case.

3. In apparatus as set forth in claim 2 wherein said display case contains a removable rack arranged for holding trays of food at vertically spaced intervals, said rack being mounted for rotation in the display case.

4. In apparatus as set forth in claim 1 wherein said means for producing and directing includes a heating chamber containing a heating element to heat a stream of air passed through the heating chamber, a moisture chamber containing a body of water to moisturize the heated stream of air and a blower for moving the air through the heat chamber and moisture chamber.

5. In apparatus as set forth in claim 1 wherein said means for producing and directing includes an inlet manifold assembly and an outlet manifold assembly spaced from the inlet manifold assembly, each of said manifold assemblies having an upright duct with two columns of spaced openings, each said column of openings being adjacent the inside surface of a wall of the housing means.

6. In apparatus as set forth in claim 5 including a baffle in the duct of the inlet manifold assembly arranged to substantially equalize the air flow through said outlet openings.

7. In apparatus as set forth in claim 1 wherein the air from the holding chamber is recycled back to said means for producing and directing in a continuous air flow system.

8. In apparatus for holding heat and moisture in food and the like, the combination comprising:
 a support housing;
 a display case on the support housing with transparent walls and a transparent access door having an inner wall surface forming a holding chamber for confining a volume of air about food and the like;
 air flow supply means including a blower coupled to a heating chamber with a heating element for producing a stream of heated air moved by the blower through the heating chamber;
 air flow directing means including an inlet manifold assembly and an outlet manifold assembly, said inlet manifold assembly being arranged in a flow communication to the air flow supply means for directing the stream of heated air in a prescribed pattern in a direction substantially parallel to and along the inner wall surface of said housing means so as to be directed away from and yet in heat exchange relation to the food without a significant amount of air movement over and in direct contact with the food, said pattern being in the nature of a vortex along the outer perimeter of the inside of the holding chamber to form a core of relatively still, heated air about the food and prevent moisture condensation on the transparent walls;

means including a moisture chamber with a water pan for humidifying said stream of heated air introduced into said holding chamber; and power control means for regulating the actuation of said blower and heating element and the temperature range of the air discharged into the inlet manifold assembly.

9. In apparatus as set forth in claim 8 wherein said display case walls are made of glass and the glass walls are readily removable from the support housing.

10. In apparatus as set forth in claim 8 wherein said water pan is in the form of a drawer slidably mounted in said support housing.

11. In apparatus as set forth in claim 8 including a canopy-type top cover removably mounted on the display case.

12. In apparatus as set forth in claim 8 including an air flow retrun box coupled between the outlet manifold assembly and an inlet of the blower to provide a negative pressure at the outlet manifold in relation to the inlet manifold assembly to recycle the air from the holding chamber in a closed air flow loop.

13. In apparatus as set forth in claim 8 wherein said power control means includes a first high current circuit for the heating element having an adjustable thermostat and a second lower current circuit to the blower motor, said low current circuit being arranged to turn off the power to the heating element when the power to the blower is removed through the operation of an overload protector.

14. In a display apparatus for holding heat and moisture in food and the like comprising in combination:

a support housing having opposed side and rear walls and a front wall having a portion forming a control panel;

a generally oblong display case on the support housing defining a holding chamber for confining a volume of air about a food and the like, said display case having a pair of opposed transparent side walls with a transparent rear wall and a transparent front door arranged to move between an open and a closed position, a heat insulated top wall and a heat insulated bottom wall;

a food holding rack removably mounted in said display case adapted to rotate in said display case, said display case having shelf portions adapted to support food trays at vertically spaced intervals;

a rack motor on said top wall releasably coupled to the rack to rotate said rack;

an air receiving box in the support housing;

a blower mounted on the air receiving box in the support housing with an inlet of the blower in receiving relation to the air box;

a heating chamber in the support housing having an inlet coupled to the blower and an outlet containing a heating element;

a moisture chamber in the support housing coupled to the outlet of the heating chamber with a water pan containing a body of water;

an inlet manifold assembly in one corner of the display case in receiving relation to the outlet of the moisture chamber;

an outlet manifold assembly in another corner of the display case spaced from the inlet manifold and coupled to said air receiving box, said manifold assemblies being arranged to direct the stream of air in a substantially vortex pattern along the perimeter of the inside of the holding chamber to form a core of relatively still, heated, moisturized air about the food and prevent moisture condensation on the inside of the walls of the display case;

each of said manifold assemblies having an upright duct with two columns of equally spaced openings arranged vertically adjacent the inside of an associated wall, a wall portion of each of said ducts having lighting means and having a translucent wall portion to pass light into the holding chamber, and a baffle in the inlet manifold duct upstream of the outlet openings to substantially equalize the air flow through the outlet openings into the holding chamber;

power control means in the support housing for selective actuation of said heating element, blower rack and lighting means, said power control means including:

a high current circuit including a current breaker, a relay contact and manually adjustable thermostat located on the control panel and said heating element;

a low current circuit independent of said high current circuit including a relay coil for controlling said relay contact, said rack motor, a motor for driving the blower and said lighting means whereby the actuation of the relay coil enables the connection of electric power to the heating element and deactuation of the relay coil removes power from the heating element as when the power to the blower motor is removed through the operation of an overload protector; and a power switch mounted on the control panel for regulating the electric power to each of said high and low current circuits whereby upon the actuation of the power switch the blower motor forces air through the heating chamber and over the surface of the body of water in the water pan and into the inlet manifold assembly where it is directed in a curtain-like vortex pattern in the holding chamber and out the outlet manifold into the air receiving box to the blower in a closed circulation loop.

15. In display apparatus as set forth in claim 14 wherein said inlet manifold assembly is disposed at one rear corner opposite the front door and said outlet manifold assembly is disposed at the opposite rear corner opposite the front door, said inlet manifold assembly has one column of outlet openings arranged at substantially equally spaced intervals adjacent the rear wall of the display case that are opposite a similar column of inlet openings in the outlet manifold assembly adjacent the rear wall, said inlet manifold assembly having a second column of outlet openings arranged at substantially equally spaced intervals adjacent a first side wall of the display case facing toward the front door and said outlet manifold assembly having a second column of inlet openings adjacent the other side wall of a number and size corresponding to said second column of outlet openings, there being less flow capacity in said columns of outlet and inlet openings adjacent the rear wall than the side walls whereby air flows from said one column of outlet openings to the opposite inlet openings and from said second column of outlet openings along the inside of said first side wall, said front door and said other side wall into the associated inlet openings in the outlet manifold assembly.

* * * * *

UNITED STATES PATENT AND TRADEMARK OFFICE
CERTIFICATE OF CORRECTION

PATENT NO. : 3,999,475
DATED : December 28, 1976
INVENTOR(S) : Ronald R. Roderick It is certified that error appears in the above-identified patent and that said Letters Patent are hereby corrected as shown below:

Col. 7, line 24 (Claim 12, line 2), change "retrun" to --return--

Col. 7, line 33 (Claim 13, line 5), change "low" to --lower--

Signed and Sealed this

Eleventh Day of July 1978

[SEAL]

Attest:

RUTH C. MASON
*Attesting Officer*

DONALD W. BANNER
*Commissioner of Patents and Trademarks*